US010293940B2

(12) United States Patent
Roth et al.

(10) Patent No.: US 10,293,940 B2
(45) Date of Patent: May 21, 2019

(54) LIFT APPARATUS FOR AN AIRCRAFT AND AN AIRCRAFT INCLUDING THE LIFT APPARATUS

(71) Applicant: Airbus Operations GmbH, Hamburg (DE)

(72) Inventors: Ingo Roth, Hamburg (DE); Sassa Nadine Boos, Schenefeld (DE); Arne Stoldt, Hamburg (DE); Sascha-Jay Salvador, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 339 days.

(21) Appl. No.: 14/968,241

(22) Filed: Dec. 14, 2015

(65) Prior Publication Data

US 2016/0167783 A1 Jun. 16, 2016

(30) Foreign Application Priority Data

Dec. 15, 2014 (EP) .................................... 14197937

(51) Int. Cl.
*B64D 11/00* (2006.01)
*B64D 9/00* (2006.01)

(52) U.S. Cl.
CPC ............ *B64D 11/0007* (2013.01); *B64D 9/00* (2013.01)

(58) Field of Classification Search
CPC ... A47B 2051/005; A47B 5/006; A47B 51/00; A47B 81/064; B64D 11/0007; B64D 11/04; B64D 9/00
See application file for complete search history.

(56) References Cited

U.S. PATENT DOCUMENTS 5,322,244 A * 6/1994 Dallmann .............. B64D 11/04
244/118.1
5,475,949 A 12/1995 McCoy
5,535,852 A 7/1996 Bishop et al.
(Continued)

FOREIGN PATENT DOCUMENTS

GB 2 131 779 A 6/1984
WO WO 2013/136282 A2 9/2013

OTHER PUBLICATIONS

European Search Report for Application No. EP 14 19 7937 dated May 18, 2015.

*Primary Examiner* — Jessica B Wong
(74) *Attorney, Agent, or Firm* — Jenkins, Wilson, Taylor & Hunt P.A.

(57) ABSTRACT

A lift apparatus for transporting objects between compartments of an aircraft through an aperture in a floor structure separating the compartments and an aircraft in which such lift apparatus is mounted. The lift apparatus includes a conveyor with a retaining portion to selectively retain and release objects to be transported, a guide to which the conveyor is mounted to be linearly movable along a predetermined path of motion defined by the guide, and a moving mechanism for driving the conveyor to linearly move along the predetermined path of motion. The retaining portion and a closing portion of the conveyor are along the path of motion, and the lift apparatus mounts in an aircraft with the path of motion extending through the aperture. The conveyor is selectively movable along the predetermined path of motion between positions.

14 Claims, 2 Drawing Sheets

(56) References Cited

U.S. PATENT DOCUMENTS

| | | | | |
|---|---|---|---|---|
| 2003/0057031 | A1* | 3/2003 | Gottlieb | B64D 9/00 187/394 |
| 2011/0084172 | A1* | 4/2011 | Fairchild | B64D 9/00 244/137.1 |

* cited by examiner

LIFT APPARATUS FOR AN AIRCRAFT AND AN AIRCRAFT INCLUDING THE LIFT APPARATUS

CROSS-REFERENCE TO RELATED APPLICATION

This application claims priority to European Patent Application No. 14197937.7 filed Dec. 15, 2014, the entire disclosure of which is incorporated by reference herein.

TECHNICAL FIELD

The present application relates to a lift apparatus for an aircraft for transporting objects between a first compartment of an aircraft and a second compartment of an aircraft through an aperture in a floor structure separating the first compartment and the second compartment from each other, and to an aircraft in which such a lift apparatus is mounted.

BACKGROUND

Aircrafts typically comprise several distinct compartments separated from each other by wall structures. In particular, such compartments generally comprise compartments arranged one above the other and separated by a floor structure, for example a passenger compartment arranged above a cargo compartment or cargo bay. In this connection it may be desirable to utilize, process or handle objects in a first compartment, such as objects in a monument mounted in the upper compartment, but to store these objects in a second compartment, such as the lower compartment, prior to their use, processing or handling in order to maximize the space available in the first compartment.

In the case of the first or upper compartment being a passenger compartment storing such objects in the second or lower compartment provides the advantage of maximizing the space available for seating passengers, thereby increasing profitability and flexibility in selecting an optimum cabin arrangement. Further, in the case of the second or lower compartment being a cargo compartment the advantage is provided that loading the objects into the aircraft is facilitated and may be carried out in accordance with standard cargo loading procedures.

One particular example for this situation is a passenger compartment in which a monument is mounted which is an aircraft galley. Such galley is mounted on a floor structure in the passenger compartment of an aircraft, and the catering goods, such as food and beverages, are often loaded in boxes and/or trolleys into the aircraft and stored in a storage rack arrangement in the galley or in a separate storage rack arrangement located within the passenger compartment. Thus, in this case considerable passenger compartment space is wasted by a storage rack arrangement. It has, therefore, been suggested to dispense with the storage rack arrangement in the passenger compartment, and to utilize instead a storage rack arrangement located in the cargo compartment below the passenger compartment. In particular, such storage rack arrangement may e.g. be provided in a removable cargo container, which can be loaded into the cargo compartment together with other conventional cargo containers. Thus, boxes and trolleys with catering goods can advantageously be stored into the storage rack arrangement outside the aircraft.

In any case, it is necessary to provide for a lift apparatus for vertically lifting objects to be utilized, processed or handled in the upper compartment from the lower compartment, i.e. in a direction perpendicularly or transversely to the floor structure. For this purpose, an aperture is provided in a portion of the floor structure, typically below a monument in which or to which the lift apparatus is mounted. A manual or automatic approach must be provided for placing objects to be lifted at a defined location in the lower compartment where they can be engaged or grabbed by the lift apparatus, or the lift apparatus must be movable in the horizontal direction, i.e. along the extension of the floor structure. In the example of a galley and the use of a storage rack arrangement in a cargo container an opening or aperture must also be provided in the upper wall portion of the container to allow for access of the lift apparatus to the boxes and/or trolleys stored inside the container.

Further, when providing an aperture in a floor structure between two compartments of an aircraft, due to safety considerations it is necessary to able to close the aperture. This is particularly the case if the two compartments have different safety classifications, such as a passenger compartment and a cargo compartment, because then the floor structure is required to provide a fire and smoke barrier in case of an emergency. In this regard it must also be taken into consideration that a cargo compartment of an aircraft will typically be flooded with Halon if a potential fire hazard is detected in the cargo compartment, but that the Halon must not enter the passenger compartment. Consequently, any approach or mechanism for closing the aperture must be constructed such that it acts as a fire and smoke barrier and as an airtight seal and the very high safety requirements in aircraft are met for various different scenarios.

For some specific applications, such as a crew rest container or a waste container being installed in the lower compartment, a manually movable cover or hatch is known. However, as a lift apparatus will typically be installed inside a monument or comprise a lift compartment inside the monument, which monument is installed immediately above the aperture, such manually movable covers may be difficult or impossible to use with a lift apparatus.

Automated cover arrangements always require additional mechanical or electrical components for the opening and closing of the aperture. For example, arrangements are known in which two flaps, one on each side of the aperture, are electrically moved towards and away from each other in order to close and open the aperture, respectively.

SUMMARY

It is therefore an object of the present disclosure to provide a lift apparatus of the above type, providing the possibility to selectively close an aperture in a simple, reliable and fail-safe manner.

This problem is solved by a lift apparatus and an aircraft as described herein. Advantageous embodiments of the lift apparatus and the aircraft are disclosed herein.

According to the present disclosure a lift apparatus is adapted for transporting objects, such as goods or boxes or trolleys including goods or other objects, e.g. catering goods, between a first compartment of an aircraft and a second compartment of an aircraft through an aperture in a floor structure separating the first compartment and the second compartment from each other.

The lift apparatus comprises a conveyor, which has a retaining portion adapted to selectively retain and release objects to be transported. For this purpose, the retaining portion may include a gripping structure, which is operable to actively grip and release an object to be transported, or passive engagement or support. For example, the retaining portion may include a support plate, on which an object to be transported can be disposed, and a coupler coupling the support plate to the remainder of the conveyor.

The lift apparatus further comprises a guide to which the conveyor is mounted such that it is linearly movable in a guided manner along a predetermined and preferably straight path of motion defined by the guide. In other words, the conveyor is movable along the guide, which defines the predetermined path of motion.

Moreover, the lift apparatus comprises a mover adapted for driving the conveyor to linearly move along the predetermined path of motion and along the guide. The mover may be or comprise at least one motor, such as, in particular, an electric motor, but may alternatively or additionally also be or comprise other mechanism(s), such as pneumatics or hydraulics. For controlling the operation of the mover and, thus, the linear movement of the conveyor and the position of the conveyor along the guide the lift apparatus may also comprise a control adapted for effecting the control. For this purpose, it may be operatively coupled with the mover by, e.g., a wired or wireless connection.

The conveyor further comprises a closing portion, wherein the retaining portion and the closing portion are disposed one after the other along the predetermined path of motion, i.e. along the direction defined by the guide. Both the retaining portion and the closing portion move together with the remainder of the conveyor, i.e. the conveyor preferably moves as a whole or as a single unit or component along the predetermined path of motion. The lift apparatus is adapted to be mounted in an aircraft, which comprises a first compartment and a second compartment separated from each other by a floor structure having an aperture. More specifically, the lift apparatus is adapted—and in particular the closing portion and the retaining portion are arranged and dimensioned—so that the lift apparatus is mountable in such a manner that the predetermined path of motion extends through the aperture, and that the conveyor is selectively movable along the predetermined path of motion between a first position, in which—along the predetermined path of motion—the closing portion is spaced from the floor structure and the aperture and at least part of the retaining portion is disposed between the floor structure and the closing portion, and a second position, in which the closing portion closes the aperture. Preferably, in the mounted condition the predetermined path of motion extends perpendicularly with respect to the floor structure. Of course, such a lift apparatus is only operable if the aperture has such dimensions that at least part of the retaining portion is movable through the aperture (together with suitable objects to be transported), and that the closing portion cannot move through the aperture, but is rather operable to completely close the aperture. In other words, the construction of the lift apparatus determines with which types of aircraft and in particular which dimensions of apertures the lift apparatus can be used.

This construction provides the advantage that selectively closing the aperture is effected automatically and in a very simple manner when moving the conveyor into a predetermined position, and that no separate closing mechanism or structure involving additional electrical or mechanical components is required. In particular, not additional parts for actuating the closing mechanism are required. Due to the reduced parts count and complexity an improvement in terms of costs, easy of maintenance and reliability is achieved. In addition to being able to provide for a fire and smoke barrier in case of an emergency, the closing portion may also be adapted to serve as an efficient acoustic barrier, which is particularly important if one of the compartments is a passenger compartment.

It is to be noted that the above lift apparatus can be constructed to be mountable in an aircraft of the above type either in such a manner that in the first position the closing portion is located in the upper one of the first and second compartments and when moving towards the second position approaches the aperture from above, or in such a manner that in the first position the closing portion is located in the lower one of the first and second compartments and when moving towards the second position approaches the aperture from below.

Further, it is also possible and may be advantageous if the conveyor additionally comprises a further closing portion. Then, the closing portion mentioned previously constitutes a first closing portion and the further closing portion constitutes a second closing portion. The retaining portion is preferably disposed between the first and second closing portions along the predetermined path of motion, i.e. along the direction defined by the guide. Both the retaining portion and the first and second closing portions move together with the remainder of the conveyor. In such an embodiment of the lift apparatus the first and second closing portions and the retaining portion are arranged and dimensioned so that the lift apparatus is mountable in the manner described in detail above, wherein in the first position the second closing portion closes the aperture and in the second position the second closing portion is spaced from the floor structure and the aperture and at least part of the retaining portion is disposed between the floor structure and the second closing portion. Apart from this the same considerations apply for both the first closing portion and the second closing portion, i.e. the preceding and the following explanations regarding the first closing portion also apply to the second closing portion.

This embodiment provides for two different positions of the conveyor in which the aperture is closed automatically and in a very simple manner by moving the conveyor into the respective predetermined position, without a need for separate closing mechanism or structure involving additional electrical or mechanical components. Thus, it is advantageously possible to arrange the lift apparatus in an aircraft of the above type such that in that both in the uppermost position of the conveyor, in which an object retained by the retaining portion is located in the upper one of the first and second compartments, and the lowermost position of the conveyor, in which an object retained by the retaining portion is located in the lower one of the first and second compartments, the aperture is closed.

In a preferred embodiment the closing portion comprises an annularly closed contact surface, which faces the retaining portion and is adapted to abut, in the mounted condition of the lift apparatus described above, an annularly closed portion of the floor structure surrounding the aperture when the conveyor is in the second position. Preferably, the contact surface, which may be a continuous surface or an annularly shaped surface extends perpendicularly with respect to the predetermined path of motion. In this embodiment the aperture is closed in a simple manner by the contact between the contact surface and annularly closed portion of the floor structure surrounding the aperture. The construction according to this embodiment has the consequence that a portion of the retaining portion adjacent or facing the closing portion or the entire retaining portion is disposed entirely inside an annularly closed circumferential edge region of the contact surface, when viewed along the predetermined path of motion.

In a preferred embodiment the closing portion is or comprises a plate-shaped element which extends in a plane which is perpendicular to the predetermined path of motion.

In a preferred embodiment the retaining portion comprises a gripping structure which is adapted for selectively gripping and releasing objects to be transported. The gripping structure may be configured to be operable manually or automatically.

In a preferred embodiment the closing portion comprises a sealing arrangement which is adapted to provide an airtight seal and/or a fire barrier when the closing portion closes an aperture in a floor structure in the manner described above when the lift apparatus is mounted in an aircraft. For example, the sealing arrangement may comprise one or more suitable sealing rings fixedly secured to the closing portion. It should be noted that in case of the above embodiment, in which the closing portion comprises a contact surface, the sealing arrangement, such as one or more sealing rings, is regarded as constituting or forming part of the contact surface. Additionally or alternatively, a sealing arrangement may also be included in the floor structure of an aircraft, such as in an annularly closed region of the floor structure surrounding the aperture. Such sealing arrangement forming part of the floor structure must be arranged in such a manner that it is contacted by the closing portion when the closing portion closes the aperture.

In a preferred embodiment the lift apparatus further comprises a frame defining an aperture and adapted to be mounted in an opening in a floor structure separating a first compartment and a second compartment of an aircraft from each other. In the mounted condition the frame then constitutes a part of the floor structure and defines the aperture in the floor structure referred to above, i.e. the aperture of the frame is then the above-mentioned aperture in the floor structure. The aperture is dimensioned such that the above considerations apply. In particular, it is preferred that the aperture of the frame has smaller dimensions than the closing portion such that the closing portion is movable into a position in which the closing portion abuts an annularly closed portion of the floor structure surrounding the aperture, thereby closing the aperture. Further, a seat, in particular an annular recessed region surrounding the aperture, may be provided in the frame, which seat is adapted for receiving the closing portion or a portion of the closing portion. The frame may also comprise a sealing arrangement as mentioned above, which may be the only sealing arrangement or cooperate with a sealing arrangement on the closing portion.

In a preferred embodiment the lift apparatus further comprises a monument which comprises a straight elongate cavity open at one of its longitudinal ends towards the exterior of the monument and defining a longitudinal axis. The guide is mounted to the monument, such as to interior walls of the monument defining the cavity. The conveyor is disposed at least partially inside the cavity, and the lift apparatus is adapted for transporting objects from outside the monument along the longitudinal axis of the cavity through its open end into the cavity. In accordance with the above explanations, the monument, which may, e.g., be a galley, is adapted to be mounted on a floor structure of an aircraft separating a first compartment and a second compartment of the aircraft from each other such that the longitudinal axis is oriented perpendicularly to the floor structure and the open end of the cavity is facing the floor structure, wherein the guide and the predetermined path of motion extend parallel to the longitudinal axis of the cavity.

In a preferred embodiment the mover comprises one or more drive for driving the conveyor and one or more brake adapted for selectively locking the conveyor in its position and releasing it to be movable by the one or more drive. The one or more drive may be or comprise electric, pneumatic and/or hydraulic devices, i.e. rely on electric, pneumatic and/or hydraulic power. The one or more drive and the one or more brake are adapted such that in the case of loss of power the one or more brake or brakes are automatically released and the one or more drive does not resist movement of the conveyor along the guide under the influence of gravity. This construction provides the advantage that the lift apparatus is mountable in such a manner that the second (closing) position of the conveyor is the lowermost position, so that in case of loss of power the conveyor automatically moves to close the aperture under the influence of gravity.

In a preferred embodiment the guide comprises two straight guide members which are spaced from each other. In case the lift apparatus comprises a monument as described above, each of the two guide members is preferably attached to or integrated into a different one of two spaced opposing wall portions of a sidewall arrangement defining the cavity and extending parallel to the longitudinal axis of the cavity. In any case, the conveyor can comprises two conveying members, each mounted to a different one of the guide members such that they are linearly moveable along the respective guide member. The mover is then, of course, adapted for driving the two conveying members to linearly move along the guide members, wherein the mover includes at least one drive for driving the two conveying members, i.e. moving them along the guide members. Preferably for each conveying member and guide member a separate drive and a separate brake are provided as well as a separate power unit for powering the drive and the brake. It is to be noted that the guide may not only include exactly two of the above-described guide members, but that embodiments may also be advantageous in which the guide comprises three or more of the above-described guide members. Then, the conveyor comprises a corresponding number or at least a corresponding number of the above-described conveying members, each mounted to a different one of the guide members such that they are linearly moveable along the respective guide member.

As already explained in detail above, the lift apparatus of any of the above-mentioned embodiments is specifically adapted to be mounted in an aircraft comprising a first compartment, a second compartment, and a floor structure separating the first and second compartments from each other and having an aperture. Therefore, the present disclosure also relates to such an aircraft comprising a lift apparatus according to any of the preceding embodiments. The lift apparatus is mounted in the aircraft in one of the manners already described in detail above, i.e. in particular such that the predetermined path of motion extends through the aperture between the first compartment and the second compartment, so that by moving the conveyor along the predetermined path of motion a portion of the conveyor can be moved through the aperture. The aperture has smaller dimensions than the closing portion, so that the closing portion is able to completely cover and close the aperture, and the conveyor and guide are adapted and arranged to enable transport of objects through the aperture between the first and second compartments while the objects are retained by the retaining portion. The conveyor is movable along the predetermined path of motion between a first position, in which the closing portion is spaced from the floor structure and the aperture and at least part of the retaining portion is disposed between the floor structure and the closing portion, and a second position, in which the closing portion closes the aperture. The second position advantageously constitutes an end position of the predetermined path of motion, wherein the closing portion and the aperture cooperate as stop.

In case the lift apparatus is of the above-described construction comprising in addition to the first closing portion a second closing portion, the aperture has also smaller dimensions than the second closing portion, so that the second closing portion is likewise able to completely cover and close the aperture. As explained in detail above, in the second position the second closing portion is spaced from the floor structure and the aperture and at least part of the retaining portion is disposed between the floor structure and the second closing portion, and in the first position the second closing portion closes the aperture. In this embodiment the first position advantageously likewise constitutes an end position of the predetermined path of motion, wherein the second closing portion and the aperture cooperate as stop. Then, the lift apparatus is advantageously arranged such that both in the uppermost of the first and second positions, in which an object retained by the retaining portion is located in the upper one of the first and second compartments, and the lowermost of the first and second positions, in which an object retained by the retaining portion is located in the lower one of the first and second compartments, the aperture is closed. Of course, this necessitates suitable dimensions of the object to be transported. In particular, the object must be arranged between the first and second closing portions.

In a preferred embodiment of the aircraft, the first and second compartments have different classifications. Preferably, the first compartment is a passenger compartment and the second compartment is a cargo compartment.

In a preferred embodiment of the aircraft the second position is the lowest possible position of the conveyor along the predetermined path of motion, i.e. the lower end position. It is particularly preferred if the mover is adapted such that in case of loss of power the conveyor moves into the second position or is maintained in the second position under the influence of gravity. For this purpose, the above-described embodiment of a lift apparatus, in which the mover comprises one or more drive and one or more brake may be advantageously utilized.

In a preferred embodiment of the aircraft the closing portion and the floor structure comprise cooperating locks for selectively mechanically locking the closing portion in the second position.

BRIEF DESCRIPTION OF THE DRAWINGS

In the following an exemplary embodiment of the disclosure herein will be described in more detail with reference to the figures.

DETAILED DESCRIPTION

Figure 1:
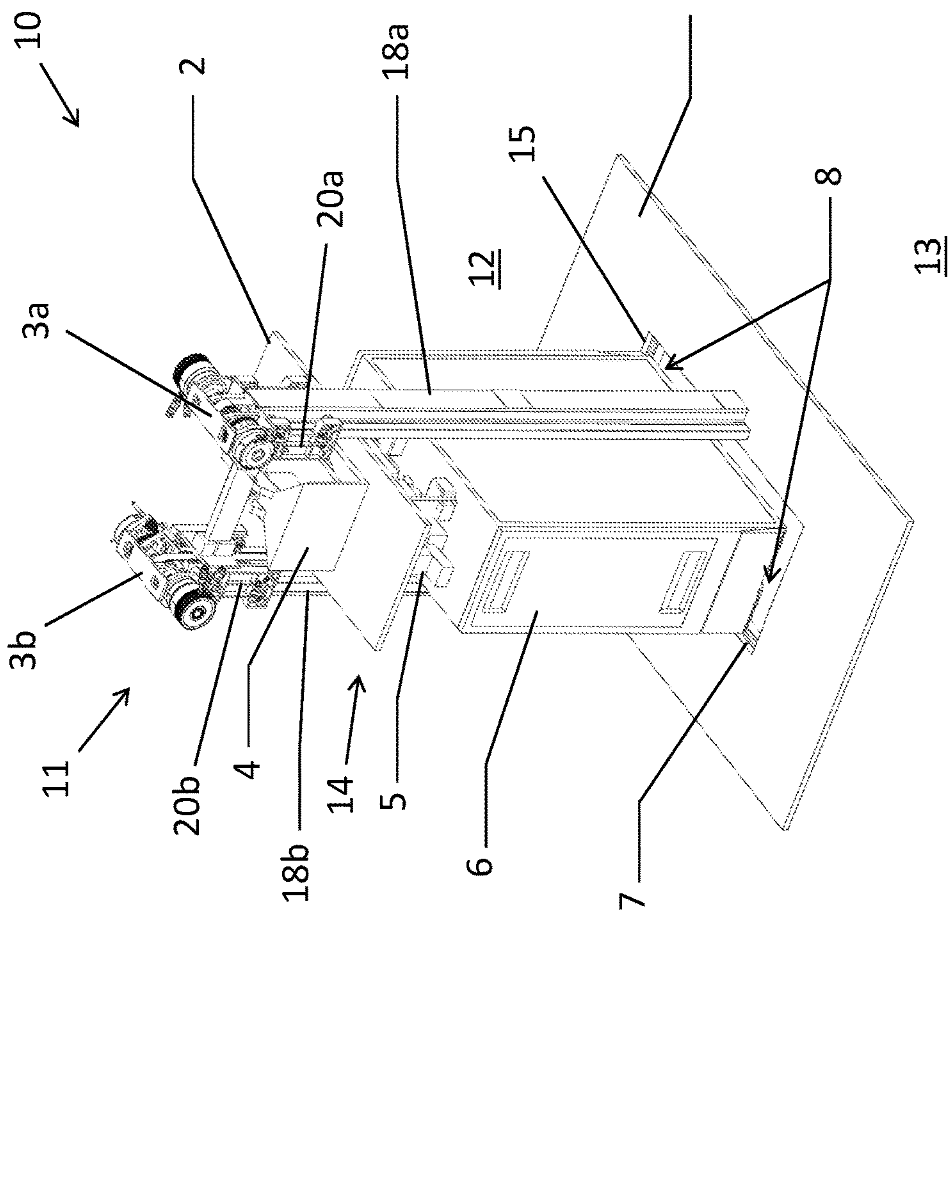
FIG. 1 shows a schematic perspective view of a lift apparatus according to the present disclosure installed in an aircraft, wherein the lift apparatus is in a position in which an aperture in a floor structure of the aircraft is open.
Figure 2:
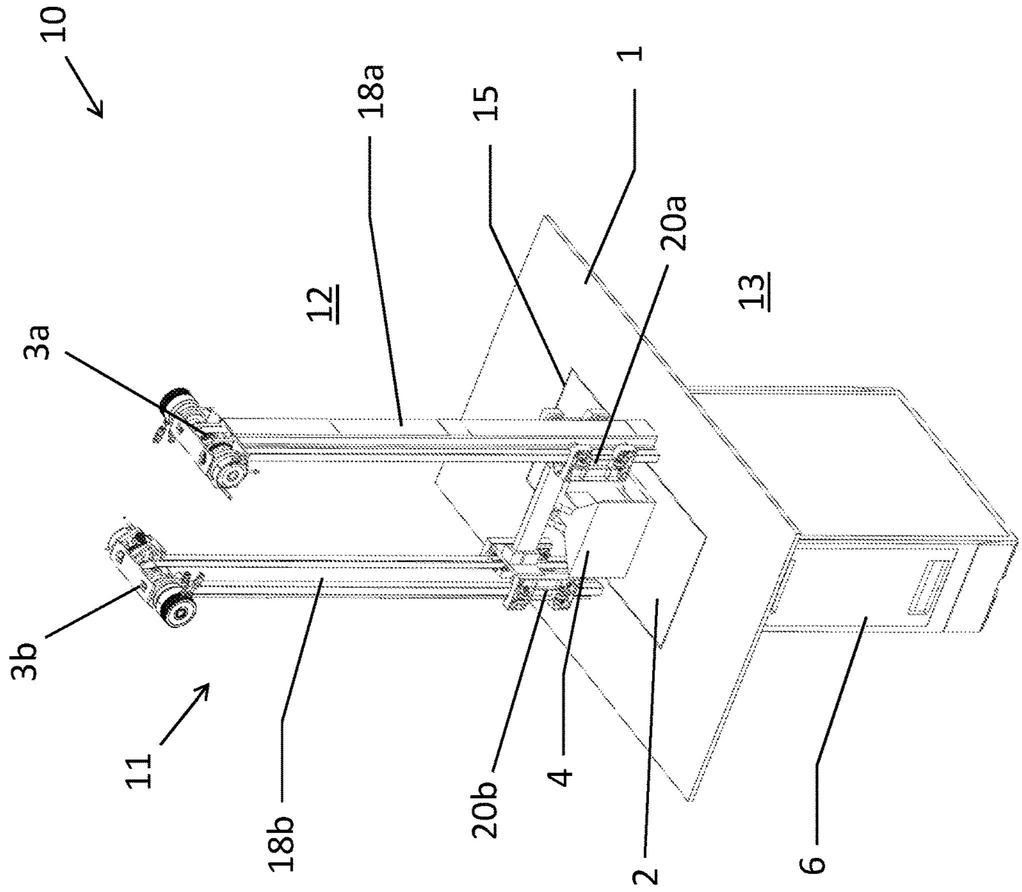
FIG. 2 shows a schematic perspective view of the lift apparatus of FIG. 1, wherein the lift apparatus is in a position in which the aperture in the floor structure of the aircraft is closed.

The aircraft 10 shown in FIGS. 1 and 2 in a perspective view comprises a lift apparatus 11 and a floor structure 1, in which a rectangular aperture 8 is provided. It is to be noted that of the aircraft 10 only the lift apparatus 11 and the floor structure 1 are shown in detail. The floor structure 1 separates a passenger compartment 12 and a cargo compartment 13 from each other.

Inside the passenger compartment 12 the lift apparatus 11 is mounted on the floor structure 1 such that the lift apparatus is arranged immediately above and aligned with the aperture 8. Typically, the lift apparatus 11 will be mounted inside a lift compartment of a monument 22, such as a galley, mounted to the floor structure 1 inside the passenger compartment 12. The lift apparatus 11 is operable for vertically transporting an object 6, such as a box, through the aperture 8 in the floor structure 1 between the first position shown in FIG. 1, in which the object 6 is disposed inside the passenger compartment 12, and the second position shown in FIG. 2, in which the object 6 is disposed inside the cargo compartment 13.

The lift apparatus 11 comprises two straight bar-shaped guide rails or masts 18*a*, 18*b* which are mounted such that they are oriented perpendicularly with respect to the floor structure 1 and a plane in which the aperture 8 extends. The guide rails 18*a*, 18*b* may e.g. be mounted to two opposing sidewalls of a lift compartment. The guide rails 18*a*, 18*b* are disposed on opposite sides of the aperture 8, i.e. at an angular distance of 180° with respect to a longitudinal axis of the aperture 8.

The lift apparatus 11 further comprises two conveying members 20*a*, 20*b*, each mounted to a different one of the guide rails 18*a*, 18*b* in such a manner that they are linearly movable along the guide rails 18*a*, 18*b* in a guided manner, i.e. in a direction perpendicular to the plane defined by the floor structure 1 and the aperture 8. The conveying members 20*a*, 20*b* constitute carriages which are secured and guided by the guide rails 18*a*, 18*b* and are able to move along the guide rails 18*a*, 18*b*. They are arranged on two opposite sides of the aperture 8 in the floor structure 1. The guide rails 18*a*, 18*b* define a predetermined path of motion.

For effecting the linear movement of the conveying members 20*a*, 20*b* two drive units 3*a*, 3*b*, which comprise electrical motors and brakes, are provided which move the conveying members 20*a*, 20*b* and are synchronized by a suitable control for the two conveying members 20*a*, 20*b* to always be at the same height above the floor structure 1 and to always move at the same speed. The drive units 3*a*, 3*b* may be adapted and arranged to move the conveying members 20*a*, 20*b* e.g. via structure such as belts (not shown) or rotating spindles (not shown).

As shown in the Figures, a compensation unit 4 is secured to the conveying members 20*a*, 20*b* such that it is arranged between them. Further, a cover plate 2 is rigidly secured to the compensation unit 4, and a gripping device 5 for selectively gripping and holding the respective object 6 to be lifted is mounted below the cover plate 2. The compensation unit 4 is constructed and coupled to the conveying members 20*a*, 20*b* in such a manner that a relative rotational movement between the conveying members 20*a*, 20*b* on the one hand and the cover plate 2 and gripping device 5 on the other hand about three perpendicular axes is possible. In this manner a jamming of the lift apparatus 11 can be avoided. The conveying members 20*a*, 20*b*, the compensation unit 4, the cover plate 2 and the gripping device 5 in combination constitute a conveyor 14, which moves as a whole along the predetermined path of motion defined by the guide rails 18*a*, 18*b*.

The dimensions and relative arrangement of the cover plate 2 and the gripping device 5 are such that, when viewed from above, the gripping device 5 does not extend beyond the outer circumferential edge of the cover plate 2 and the gripping device 5 is located inside a region located inside an annularly closed circumferential edge region of the cover plate 2. Thus, on its lower surface, which faces the gripping device 5, the cover plate 2 comprises an annularly closed circumferentially extending contact surface into which the gripping device 5 does not extend when viewed from above. Further, the shape and dimensions of the cover plate 2 correspond to a recessed portion 15 of the floor structure 1, in which recessed portion 15 the aperture 8 is provided. The dimensions of the aperture are slightly smaller than the dimensions of the recessed portion 15, such that an annularly closed circumferentially extending support surface 7 is provided as part of the floor structure 1 and surrounding the aperture 8. The support surface 7 and/or the contact surface of the cover plate 2 comprise suitable sealing structure.

Due to the above construction, by moving the conveying members 20*a*, 20*b* the gripping device 5 can be linearly moved from the position shown in FIG. 1 through the aperture 8 into the position inside the cargo compartment 13 shown in FIG. 2 and vice versa, while gripping and retaining an object 6 to be transported. In each of the two positions the gripping device 5 can be operated to selectively release and grip the object 6, as desired. In the position shown in FIG. 1, in which the conveyor 14 is located in the uppermost position along the predetermined path of motion and the aperture 8 is open with the object 6 being located immediately above the open aperture 8. Importantly, when moving the conveyor 14 into the position shown in FIG. 2 the contact surface of the cover plate 2 abuts the support surface 7 surrounding the aperture 8, thereby sealingly closing the aperture 8.

Thus, closing the aperture 8 is automatically effected with the normal movement of the conveyor 14 into the lowermost position, in which the gripping device 5 is disposed inside the cargo compartment 13. Advantageously the drive units 3*a*, 3*b* are constructed such that in case of loss of electric power the conveyor 14 automatically moves into the position of FIG. 2 under the influence of gravity, thereby closing the aperture 8.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lift apparatus for transporting objects between a first compartment of an aircraft and a second compartment of the aircraft through an aperture in a floor structure separating the first compartment and the second compartment from each other, the lift apparatus comprising:

a conveyor comprising a retaining portion that selectively retains and releases objects to be transported;

a guide to which the conveyor is mounted such that the conveyor is linearly movable in a guided manner along a predetermined path of motion defined by the guide, wherein the guide is disposed in only the first or the second compartment; and a mover for driving the conveyor to linearly move along the predetermined path of motion;

the conveyor further comprising a closing portion, wherein the retaining portion and the closing portion are disposed one after the other along the predetermined path of motion, and wherein the lift apparatus is configured to be mounted in the aircraft such that the predetermined path of motion defined by the guide extends through the aperture, wherein the conveyor is selectively movable along the predetermined path of motion between a first position, in which the closing portion is spaced from the floor structure and the aperture and at least part of the retaining portion is disposed between the floor structure and the closing portion, and a second position, in which the closing portion closes the aperture, and wherein the closing portion comprises a continuous contact surface, which faces the retaining portion and abuts a recessed portion of the floor structure surrounding the aperture when the conveyor is in the second position.

2. The lift apparatus according to claim 1, wherein the closing portion comprises a plate-shaped element which extends in a plane which is perpendicular to the predetermined path of motion.

3. The lift apparatus according to claim 1, wherein the retaining portion includes a gripping device which is adapted for selectively gripping and releasing objects to be transported.

4. The lift apparatus according to claim 1, wherein the closing portion comprises a sealing arrangement which provides an airtight seal or a fire barrier when the closing portion closes the aperture.

5. The lift apparatus according to claim 1, wherein the aperture has smaller dimensions than the closing portion such that the closing portion is movable into a position in which the closing portion abuts the floor structure.

6. The lift apparatus according to claim 1, further comprising a monument mounted on the floor structure in the first compartment and having a longitudinal axis oriented perpendicularly to the floor structure, wherein the monument comprises a straight elongate cavity with an open end of the cavity facing the floor structure, wherein the guide is mounted to the monument, the conveyor is disposed at least partially inside the cavity, and the lift apparatus is configured to transport objects from outside the monument along the longitudinal axis through the open end into the cavity, and wherein the guide and the predetermined path of motion extend parallel to the longitudinal axis of the cavity.

7. The lift apparatus according to claim 1, wherein the mover comprises at least one drive for driving the conveyor and at least one brake for selectively locking the conveyor in a position and releasing the conveyor to be movable by the at least one drive, wherein the at least one drive and the at least one brake are configured such that in the case of loss of power the at least one brake is automatically released and the at least one drive does not resist movement of the conveyor along the guide under influence of gravity.

8. The lift apparatus according to claim 1, wherein the guide comprises a plurality of straight guide members which are spaced from each other; and the conveyor comprises a plurality of conveying members, one for each of the guide members and each mounted to a different one of the guide members such that they are linearly moveable along the respective guide member.

9. An aircraft comprising:

a first compartment;

a second compartment;

a floor structure separating the first and second compartments from each other and having an aperture; and a lift apparatus according to claim 1, wherein:

the lift apparatus is mounted in the aircraft such that the predetermined path of motion extends through the aperture between the first compartment and the second compartment;

the aperture has smaller dimensions than the closing portion, so that the closing portion is able to completely cover and close the aperture, and the conveyor and guide are adapted and arranged to enable transport of objects through the aperture between the first and second compartments while the objects are retained by the retaining portion; and the conveyor is movable along the predetermined path of motion between a first position, in which the closing portion is spaced from the floor structure and the aperture and at least part of the retaining portion is disposed between the floor structure and the closing portion, and a second position, in which the closing portion closes the aperture.

10. The aircraft according to claim 9, wherein the first compartment is a passenger compartment and the second compartment is a cargo compartment.

11. The aircraft according to claim 9, wherein the second position is the lowest possible position of the conveyor along the predetermined path of motion.

12. The aircraft according to claim 11, wherein the mover is adapted such that in case of loss of power the conveyor moves into the second position or is maintained in the second position under the influence of gravity.

13. The aircraft according to claim 12, wherein the lift apparatus is a lift apparatus according to claim 7.

14. The aircraft according to claim 9, wherein the closing portion and the floor structure comprise cooperating locks for selectively mechanically locking the closing portion in the second position.

* * * * *